(12) United States Patent
Oliver et al.

(10) Patent No.: US 7,092,773 B1
(45) Date of Patent: Aug. 15, 2006

(54) METHOD AND SYSTEM FOR PROVIDING ENHANCED EDITING CAPABILITIES

(75) Inventors: Richard Joseph Oliver, Laguna Beach, CA (US); Roger Mather Duvall, Garden Grove, CA (US)

(73) Assignees: Sony Corporation, Tokyo (JP); Sony Pictures Entertainment, Inc., Culver City, CA (US)

( * ) Notice: Subject to any disclaimer, the term of this patent is extended or adjusted under 35 U.S.C. 154(b) by 0 days.

(21) Appl. No.: 08/936,338

(22) Filed: Sep. 24, 1997

(51) Int. Cl.
*G11B 27/02* (2006.01)

(52) U.S. Cl. .................. 700/94; 360/13; 369/47.13; 369/83

(58) Field of Classification Search .................. 700/94; 395/427; 360/13, 19; 369/124, 48, 30.05, 369/30.19, 47.13, 83
See application file for complete search history.

(56) References Cited

U.S. PATENT DOCUMENTS

| | | | | |
|---|---|---|---|---|
| 4,591,926 A | * | 5/1986 | Gaskell et al. .................. 360/13 |
| 5,303,218 A | * | 4/1994 | Miyake ........................ 369/48 |
| 5,343,451 A | * | 8/1994 | Iizuka ..................... 369/30.19 |
| 5,373,493 A | * | 12/1994 | Iizuka ......................... 369/124 |
| 5,457,579 A | * | 10/1995 | Bannai et al. ............. 360/19.1 |
| 5,642,492 A | * | 6/1997 | Iizuka ......................... 395/427 |
| 5,926,332 A | * | 7/1999 | Yahagi et al. ................. 360/13 |

* cited by examiner

*Primary Examiner*—Brian T. Pendleton
(74) *Attorney, Agent, or Firm*—Blakely, Sokoloff, Taylor & ZafmanLLP

(57) ABSTRACT

A method and system for providing enhanced editing capability of media data. Media data arriving in a continuous stream is saved in a buffer. When a user enters record mode, some data received before record mode was entered is designated for permanent storage. Similarly, all data received while in record mode is designated for permanent storage. Once the user leaves record mode, additional data received after leaving record mode is also designated for permanent storage. In due course all data designated for permanent storage is stored to a mass storage device. Any data in the buffer not designated for permanent storage will be overwritten without being stored to the mass storage device. In this manner, a media file having record handles is created. The record handles permit a user to slide the nominal entry and exit from record mode to accommodate timing and synchronization errors.

13 Claims, 3 Drawing Sheets

METHOD AND SYSTEM FOR PROVIDING ENHANCED EDITING CAPABILITIES

BACKGROUND OF INVENTION

1. Field of the Invention

The invention relates to digital signal processing. More specifically, the invention relates to a recording technique applicable to a media stream, which provides enhanced editing features.

2. Related Art

Recording of a media stream, for example an audio stream, has in the past typically been recorded on a continuous tape. At the time recording was to begin, a user would punch in and the tape would begin to record continuously until the user punched out. The subsequent punch in would take up from the point of the previous punch out. Ultimately, for editing purposes it might be desirable to rewind the tape and record over some portion of it. The result achieved might be for example, a segment of the original recording followed by a segment that was recorded over followed by more of the original recording. In this technique the original recording in the rerecorded segment is lost and cannot be recovered. Accordingly, this type of editing is known as destructive editing.

More recently, the use of computers and more particularly random access storage media in sound recording has significantly changed the format and editing possibilities available. Two such possibilities are non-linear editing and non-destructive editing. Non-linear editing amounts to the manipulation of pointers to media files. Non-destructive editing requires that all original media files be maintained. This permits edits to be undone, including a record over edit, simply by pointer manipulation. The down side to non-destructive editing is that it uses more disk space than is represented to the user. In spite of this down side, non-destructive editing has gained wide acceptance.

FIG. 1 is a diagram of an example of a prior art non-linear non-destructive editing technique. The user view of a media track is an event list. An event is a software object including a media file ID, an off-set into the media file, and a length from the offset. For example, a first media file 1 might be given ID 1. The event may then have an offset of zero, meaning it starts at the first sample of the media file 1, and a length of ten, meaning that the first ten samples beginning at the offset (here zero) will appear in the user view of the recording. Thus, referring to FIG. 1, the first media file 1 with ID 1 and a second media file 2 with ID 2 are saved to a random access medium. A user's view 10 of the track is an event list having three events of the form ID, offset, length: 1, 0, 10; 2, 0, 10 and 1, 20, 10. This assumes a length of ten samples which is artificially short for most real world applications, but nevertheless, suitable for illustration. Thus, while the random access device such as a hard disk contains media file 1 in its entirety and media file 2 in its entirety, from the user perspective the track contains the first ten samples of media file 1, followed by rerecorded region 8 containing ten samples of media file 2, which is in turn followed by the last ten samples from media file 1. The dotted lines in media file 1 delimit the rerecorded region 8 from the users perspective.

Notably, the beginning of media file 1 coincides exactly with the punch in point 5 and the end of media file 1 coincides exactly with the punch out point 6. An analogous case exists with respect to media file 2. The punch in point 5 and the punch out point 6 are the points at which the recording device receives the signal to begin recording or end recording respectively. Thus, particularly in the editing context where one is trying to record over a region of an existing track, a high degree of precision is required to properly time the begin and end of the rerecorded region 8 to achieve the desired effect. Even using nonlinear and nondestructive editing techniques if the punch in is too late or the punch out is too early, media file 2 will need to be discarded and another attempt to record the desired segment will be required.

In view of the foregoing, it would be desirable to be able to accommodate the imprecision of users punching in and punching out, thereby providing enhanced editing possibilities and improved editing efficiency.

SUMMARY OF THE INVENTION

A method and system for providing enhanced editing capability is disclosed. As with analog audio technology such as tape machines, most digital media recorders save data from the media input only when explicitly placed in record mode. Normally the desire is that a specific interval of media input be saved to permanent storage. However, if the system is placed in record mode any later than the start of the interval, or taken out of record mode any earlier than the end of the interval, input data near the ends of the interval will be lost. This invention guarantees that media data stays in a buffer for at least a minimum amount of time after it has been received at the input, regardless of whether the system is in record mode or not. When the user enters record mode (punches in) the incoming media input data is designated to be permanently stored on, for example, a hard disk. Additionally, buffered data for the media just prior to the punch in point is also designated to be stored to permanent storage. When the user leaves record mode (punches out) data for a predetermined period of time after punch out is also designated to be permanently stored. The extra media data before the punch in point and after the punch out point are referred to as record handles. From the users view, the audio track does not include the record handles, but the data in the record handles can be accessed by manipulating pointers in the event list to include some, all or none of the record handles (at which point the user view will include the selected portion of the record handle(s)). In this manner, the difficulty of precisely timing the punch in and punch out points is alleviated.

DETAILED DESCRIPTION OF THE INVENTION

Figure 1:
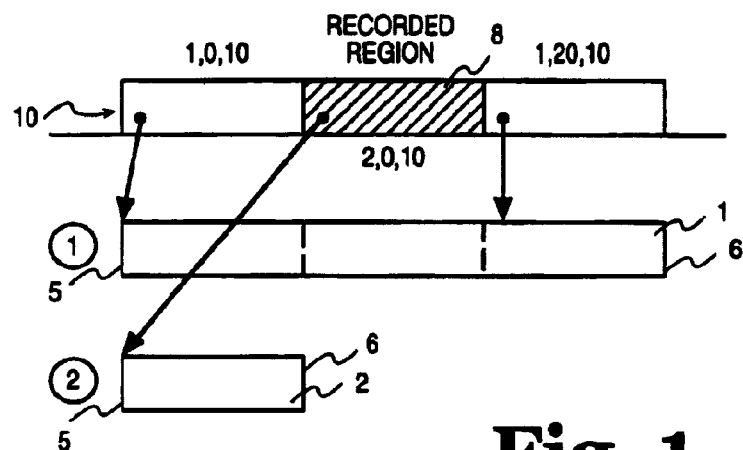
FIG. 1 is a diagram of an example of a prior art non-linear non-destructive editing technique.
Figure 2:
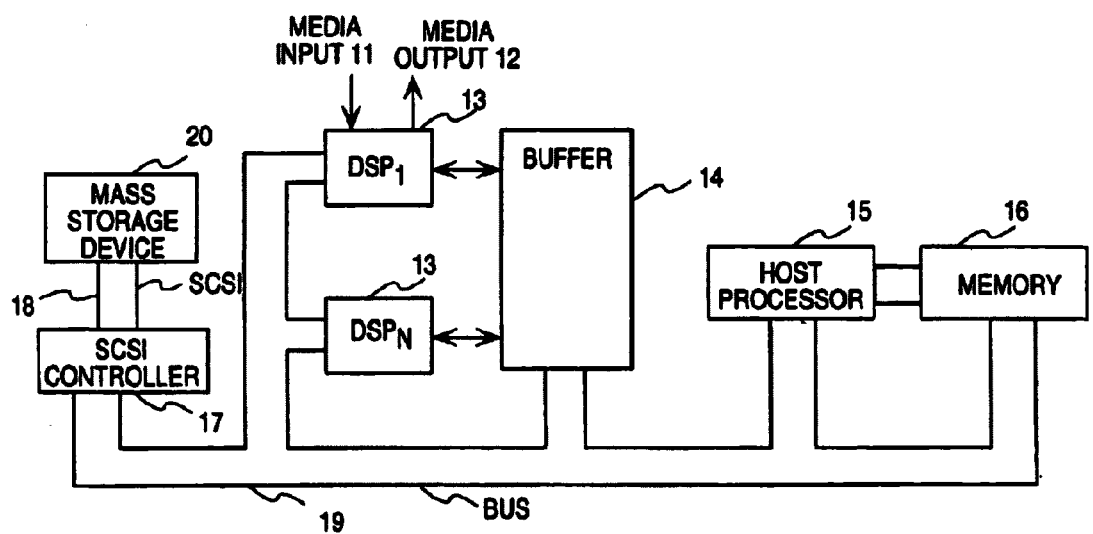
FIG. 2 is a block diagram of a system of one embodiment of the invention.

FIG. 2 is a block diagram of a system of one embodiment of the invention. One or more media input streams 11 are provided to a digital signal processor (DSP) 13. A one to one correspondence between input streams and DSP's 13 is not required. The DSP 13 continually sources the incoming media to buffer 14. Buffer 14 has portions thereof allocated to accommodate each of the incoming media streams 11.

Buffer 14 is also coupled to a bus 19. A host processor 15 is directly coupled to a memory 16 and also coupled to the bus 19. A Small Computer System Interface (SCSI) controller 17 is coupled to bus 19 and to a mass storage device 20 via a SCSI bus 18. DSP's 13 are also coupled to bus 19.

In one embodiment, bus 19 is a Peripheral Compenent Interconnect (PCI) bus. The mass storage device is a removable rotating magnetic disc having a SCSI port. This allows the mass storage device to be readily disconnected and exchanged for a new device thereby limiting the effect of disk space constraints. The buffer 14 is comprised of 32 megabytes of random access memory (RAM). In such system if 16 media input streams and 16 media output streams exist, nominally one megabyte of the buffer will be allocated to each input stream. If the media input stream is a 16-bit audio stream, one megabyte corresponds to approximately ten seconds of audio data. Typical audio data is either 16-bit or 24-bit audio at 48 kHz. The allocated portion of buffer 14 is further broken down into a number of blocks. A block is equal to a transaction size between the buffer 14 and mass storage 20 device. Because of the overhead of conducting each transaction, it is desirable to make the block size relatively large. In one embodiment, a 64 kB block size is used. For 16-bit audio at 48 kHz, this means each block contains approximately two thirds of a second of audio data. Once the allocated portion of the buffer 14 is full, a steady state condition exists wherein as each block is filled an oldest block of data in the allocated portion of buffer 14 must be reallocated to be overwritten.

The DSP 13 receiving the media input stream 11 adjusts the input gain, detects for overflow errors and packs the media data for storage in the buffer 14. In the embodiment discussed above, because while the device is on the buffer is continually receiving new data from the input channel, after approximately ten seconds the portion of buffer 14 allocated to a particular channel will be full and will remain full (e.g., in steady state) throughout the remainder of the recording session.

Host processor 15 is responsible for allocation of blocks in the buffer as well as designating blocks in the buffer to be permanently stored. Subsequent to receipt of a punch in signal, blocks of data in the buffer corresponding to a previous user settable interval (e.g., one second by default) of time are tagged for subsequent permanent storage to the mass storage device. The punch in signal may be received from the user interface, over a network, or via a DSP generated interupt. Additionally, all blocks between the punch in signal and a next punch out signal will be tagged for permanent storage. Once the punch out signal is received blocks corresponding to a user settable period of time (e.g., one second by default) following the punch out signal will also be tagged for permanent storage. In this way blocks of data before the punch in signal and data after the punch out signal will be saved to mass storage device 20 when the blocks are checked for reallocation. Thus, mass storage device 20 will contain a media file having a first record handle, an intended record interval, and a second record handle. Notably, the size of the blocks will likely cause more than the user set amount of data to be permanently stored. However, if the user has designated one second record handle, the system guarantees the extra data saved will be at least one second worth of data.

Typically each record interval is saved to its own media file. However, in some cases a user may punch in, punch out and punch back in again. If the record handles for the record intervals overlap, both intervals will be saved to a common media file and will share a common record handle between them. From the user view, the common media file appears as two events, one corresponding to each record interval.

Figure 3:
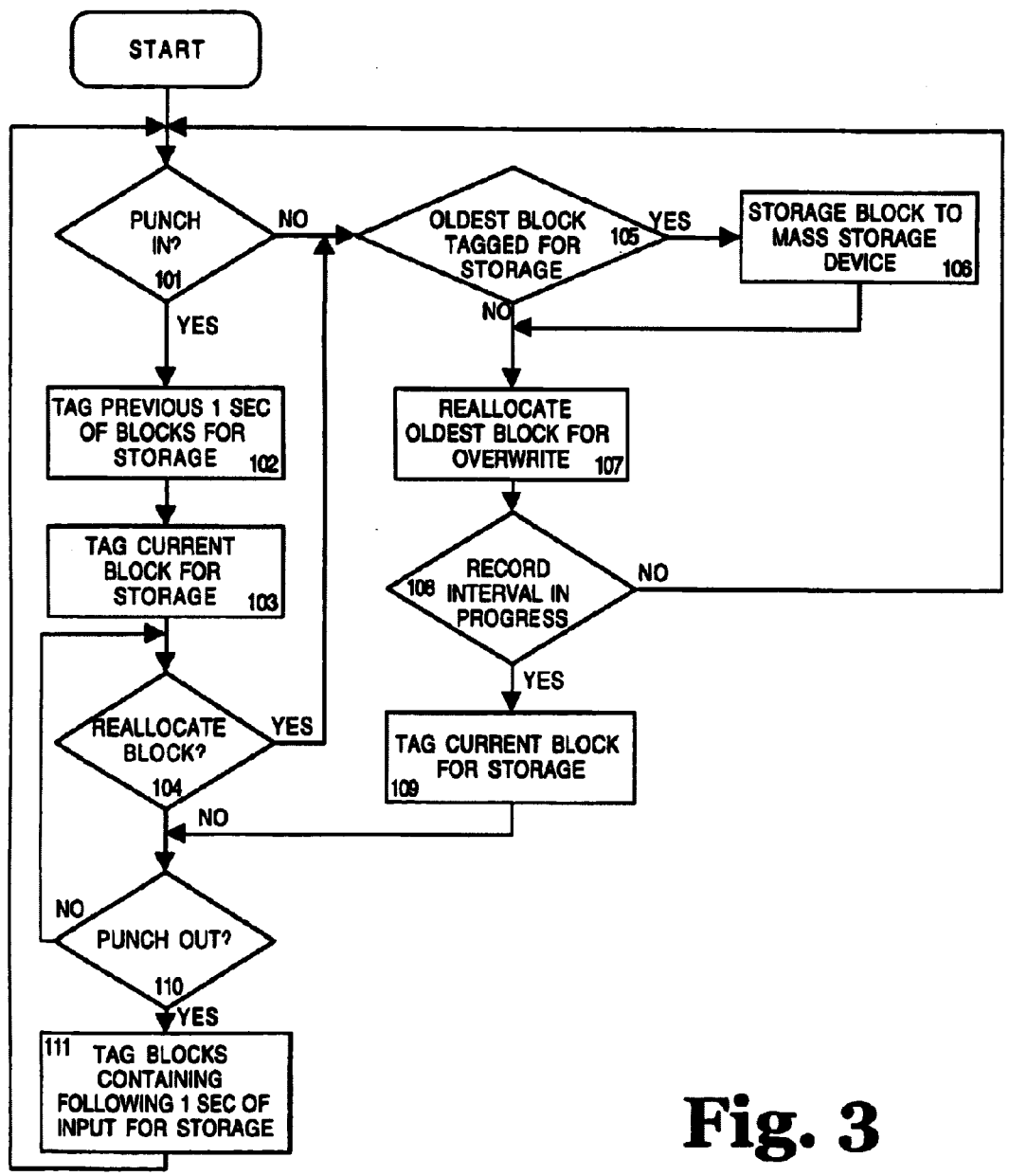
FIG. 3 is a flow chart of buffer operation in one embodiment of the invention after steady state is reached.

FIG. 3 is a flow chart of buffer operation in one embodiment of the invention after steady state is reached. Throughout a recording session media data is continually flowing into and being saved in the buffer. The system watches for a punch in signal indicating that a record interval is commencing. As used herein a recording session is a period of time that may contain one or more record intervals. A record interval is the period between a punch in and a corresponding punch out. A determination is made, at decision block 101, if a punch in signal has been received. If it has, at functional block 102, the block(s) of the buffer containing the previous one second of samples from the input stream are tagged for storage. At functional block 103, the current block is tagged for storage. A determination is made, at decision block 104, if the block should be allocated.

If a block needs to be reallocated, then at decision block 105, a determination is made if the oldest block of data has been tagged for storage. If it has, at functional block 106, the block is stored to the mass storage device. Otherwise or after storage occurs, the oldest block is reallocated to be overwritten at functional block 107. A determination is then made at decision block 108 if a record interval is in progress. A record interval is deemed to be in progress if a punch in signal has been received and no corresponding punch out signal has been received. If a record interval is in progress, the reallocated block is tagged for storage at functional block 109. If the block is not full, at decision block 104, or after tagging the block for storage at functional block 109, a determination is made if a punch out signal has been received at decision block 110. If no punch out signal has been received the system returns to decision block 104. Otherwise, once the punch out signal is received, at functional block 111 the blocks containing the following one second of input data are tagged for storage.

Figure 4:
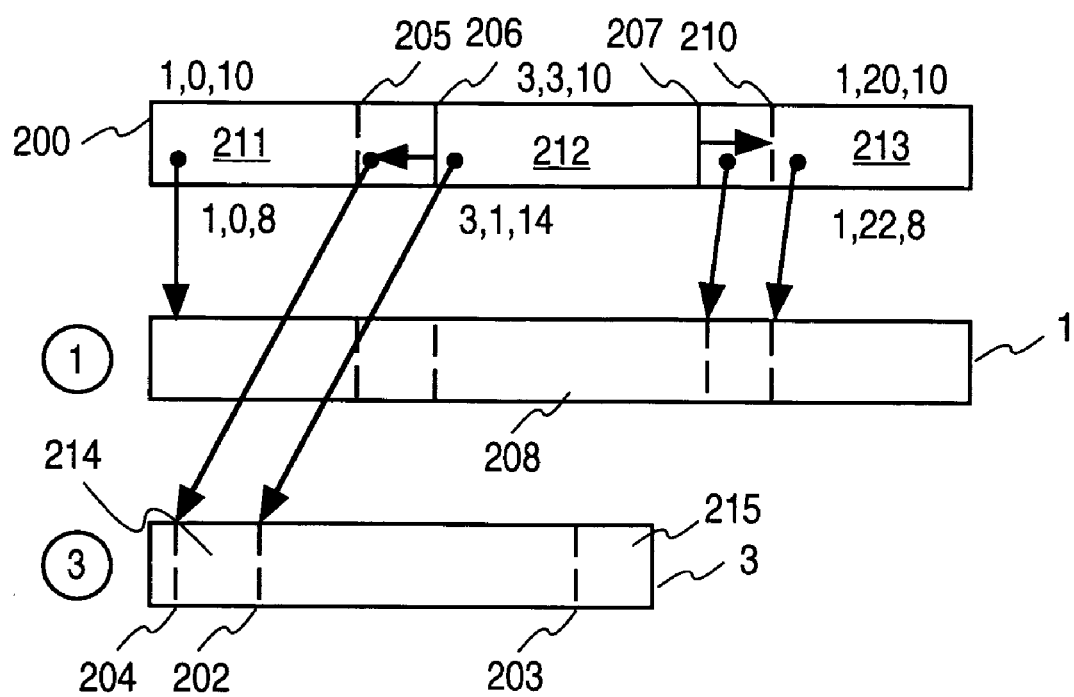
FIG. 4 is a diagram of editing using a media file with the record handles of one embodiment of the invention.

FIG. 4 is a diagram of editing using a media file with the record handles of one embodiment of the invention. The user view event list 200 is composed of three events 211, 212, and 213. Events 211 and 213 are from media file 1. Event 212 corresponds with rerecorded segment in 208 of media file 1. Event 212 is provided from media file 3 which has been recorded in accordance with one embodiment of the invention. In this example, record handles 214 and 215 are two samples long. Nominal punch in point 202 and the nominal punch out point 203 are the default boundaries of what the user sees in the event list for the track. However, because of the record handles the effective punch in point and punch out point can be moved up to three samples earlier for the punch in point or three samples later for the punch out point. Thus, while the default user event list would be for example 1, 0, 10; 3, 3, 10; 1, 20, 10 (following the format media file ID, offset, length) the user could shift the end points 206 and 207 of event 212 to be 205 and 210 with a resulting event list being 1, 0, 8; 3, 1, 14; and 1, 22, 8. Other shifts are of course possible. This shifts the effective punch in point of media file 3 to point 204. While there need be no explicit shift of nominal punch out point 203, in the above example if no record handle 215 existed, an error would be generated.

Numerous other editing possibilities exist given the existence of the record handles. For example, if the media file record interval of media file 3 is out of sync with other tracks (not shown), a user can simply slide the effective punch in point to an earlier sample and maintain the same length thereby resyncing the tracks. Also as noted above, because the typical block size does not provide perfect granularity, there may be more extra input data actually stored to the media file than the, e.g. one second record handle. In such case, the system may either permit the user to access all stored data or restrict the user to the explicitly set record handle size. While the invention is particularly useful in an audio context, it would also be suitable for use with other continuous stream media such as, without limitation, video and Musical Instrument Digital Interface (MIDI) data. All of these options are within the scope and contemplation of the invention.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. A method comprising:
    receiving a media input stream:
    saving data corresponding to the media input stream in a buffer continuously during a time interval;
    selecting portions of the buffer for storage in a media file on a mass storage device responsive to a punch in signal and a punch out signal, the media file comprises a first record handle before a punch in point, a second record handle between a punch out point and the end of the media file, and a record interval between the punch in point and the punch out point;
    editing an event list for an audio track by inserting an event corresponding to the media file; and
    adjusting an offset and a length of the event to include a portion or at least one record handle.

2. The method of claim 1 wherein in the first record handle is approximately one second of audio data preceding the punch in signal and the second record handle is approximately one second of audio data following the punch out signal.

3. The method of claim 1 further comprising allocating a portion of the buffer to each of a plurality of input channels wherein a plurality of media input streams source data to the plurality of input channels.

4. The method of claim 1 wherein selecting comprises:
    tagging a buffer block filled preceding the punch in signal with a storage tag;
    tagging all buffer blocks between the punch in signal and punch out signal with a storage tag; and
    tagging a buffer block filled following the punch out signal with a storage tag.

5. The method of claim 4 further comprising:
    checking a buffer block for a storage tag prior to reallocating the buffer block to be overwritten;
    storing all contiguous buffer blocks containing a storage tag in the mass storage device as the media file; and
    reallocating the buffer block to be overwritten if no storage tag exists or after the data has been stored to the media file if a storage tag exists.

6. A system comprising:
    a signal processor adapted to process a media input stream;
    a buffer coupled to the signal processor, the buffer adapted to continuously load data corresponding to the media input stream; and
    a mass storage device coupled to the buffer, the mass storage device adapted to store a media file derived from the media input stream comprising media samples preceding a punch in signal, media samples following a punch out signal, and a plurality of media samples between the punch in signal and the punch out signal,
    wherein the buffer is both loaded and unloaded in a first in first out (FIFO) manner such that, once the buffer is full, an oldest block of data in the buffer will be reallocated to be overwritten on a next load, and
    wherein if the oldest block of data is tagged for storage, the oldest block will be stored to the mass storage device before being reallocated.

7. The system of claim 6 further comprises a host processor for controlling the storage of data from the buffer to the mass storage device.

8. The system of claim 6 wherein responsive to a punch in signal a data block earlier in time than the punch in signal is tagged for storage to the mass storage device.

9. The system of claim 6 wherein any block containing data from one second before punch in until one second after punch out is tagged for storage in a single media file on the mass storage device.

10. The system of claim 6 wherein the buffer is a random access memory (RAM).

11. The system of claim 10 wherein the input stream comprises up to sixteen channels and the RAM is logically allocated amongst the channels.

12. A method comprising:
    receiving a media input stream;
    saving data corresponding to the media input stream in a buffer continuously during a time interval; and
    selecting portions of the buffer for storage in a media file on a mass storage device responsive to a punch in signal and a punch out signal, the media file comprises a first record handle before a punch in point, a second record handle between a punch out point and the end of the media file, a record interval between the punch in point and the punch out point, and input stream data before the punch in signal and after the punch out signal accessible by manipulating a pointer to allow selective shifting of effective punch in and punch out points of the media file.

13. The method of claim 12 wherein the time interval, during which the data corresponding to the media input stream is continuously saved in the buffer, starts and terminates independently of the punch in signal and the punch out signal.

* * * * *